United States Patent [19]

Mitchell et al.

[11] 3,919,408

[45] Nov. 11, 1975

[54] ALCOHOL-CONTAINING ORAL HYGIENE POWDERS

[75] Inventors: William A. Mitchell, Lincoln Park, N.J.; William C. Seidel, Monsey, N.Y.

[73] Assignee: General Foods Corporation, White Plains, N.Y.

[22] Filed: Mar. 4, 1974

[21] Appl. No.: 448,125

Related U.S. Application Data

[63] Continuation-in-part of Ser. No. 345,143, March 26, 1973, Pat. No. 3,821,433, which is a continuation-in-part of Ser. No. 240,272, March 31, 1972, Pat. No. 3,795,747.

[52] U.S. Cl. ................................. 424/49; 426/592
[51] Int. Cl.² ......................................... A61K 7/16
[58] Field of Search ................................. 426/592

[56] References Cited
UNITED STATES PATENTS

| 3,436,224 | 4/1969 | Bode | 426/592 |
|---|---|---|---|
| 3,795,747 | 3/1974 | Mitchell et al. | 426/592 |
| 3,821,433 | 6/1974 | Mitchell et al. | 200/338 |

FOREIGN PATENTS OR APPLICATIONS

| 1,138,124 | 12/1968 | United Kingdom |
|---|---|---|

*Primary Examiner*—Shep K. Rose
*Attorney, Agent, or Firm*—Bruno P. Struzzi; Thomas V. Sullivan; Howard J. Newby

[57] ABSTRACT

Flowable powders having up to 60% alcohol content are prepared by the sorption of the alcohol with bulked, low dextrose equivalent dextrins. The resulting products are stable when hermetically packaged and are particularly qualified as alcohol-containing base materials for oral hygiene powder preparations.

11 Claims, No Drawings

ALCOHOL-CONTAINING ORAL HYGIENE POWDERS

This application is a continuation-in-part of application Ser. No. 354,143 filed Mar. 26, 1973 now U.S. Pat. No. 3,821,433 issued June 28, 1974 which, in turn, is a continuation-in-part application of Ser. No. 240,272 filed Mar. 31, 1972 now U.S. Pat. No. 3,795,747 issued Mar. 5, 1974.

BACKGROUND OF THE INVENTION

1. Field of the Invention

The present invention generally relates to alcohol-containing solids and, in particular, is directed to powders containing substantial amounts of alcohol. More specifically, the invention pertains to alcohol-containing mouthwash and other oral hygiene powders.

2. Description of the Prior Art

Prior efforts to make edible, alcohol-containing powdered materials have been limited to the use of carbohydrate materials in very dry condition in order to have a significant amount of alcohol, specifically ethanol, sorbed by the dehydrated solids. For the most part, the prior art has employed polysaccharides which are either undesirably sweet or those which dissolve with considerable difficulty in cold water to produce cloudy appearing beverages. Also, because of the relatively low levels of alcohol fixation, in order to obtain effective levels of alcohol in the products prepared by reconstituting the prior art powders, it has been necessary to include excessive amounts of carbohydrate and/or polysaccharide fixative. The presence of excessive fixative results in reconstituted products having too high viscosity, poor appearance and texture.

Sato, (Great Britain Pat. No. 1,138,124) discloses the use of anhydrous lactose as a medium for adsorping and/or absorbing ethanol. Sato identifies lactose anhydrate as the material for combination with the ethyl alcohol to provide a stable alcohol-containing powder and implies that anhydrous alcohol must be employed in the preparation of the product since the presence of water would convert the lactose to the unacceptable hydrated crystalline form.

Bode, (U.S. Pat. No. 3,436,224) describes the preparation of an alcoholic dry beverage powder by dehydrating a vapor-sorbable particulated, starch based polysaccharide material to a moisture content of less than 0.75% and exposing the dehydrated material to anhydrous ethanol.

In both instances, it is to be noted, the prior art processes rely upon the substantially complete removal of physically or chemically combined water from the solid prior to and during the sorption of ethanol by the dehydrated solid substances. In contrast to the prior art, it has now been discovered that certain polysaccharide materials, when suitably modified with respect to physical form, will, in the presence of significant amounts of water, sorb large quantities of alcohol to form stable, flowable powders containing up to 60% by weight alcohol. Significantly, certain of these alcohol-containing powders will readily dissolve in cold water to form low-viscosity, clear, colorless, alcoholic solutions.

SUMMARY OF THE INVENTION

Accordingly, it is an object of the present invention to provide a flowable, high alcohol-containing powder which can be produced in the presence of substantial quantities of moisture and which, when packaged in a sealed container, is stable.

It is another object of the invention to provide a high alcohol-containing polysaccharide powder which readily dissolves in cold water to form a clear, low-viscosity, colorless liquid.

It is another object of the present invention to provide a high alcohol-containing powder which is flowable and has a minimum tendency to lump and otherwise form compacted aggregates.

It is still another object of the invention to provide a high alcohol-containing powder which can be used as a base for a mouthwash or similar oral hygiene preparations.

It is yet another object of the invention to provide a powder, which in addition to containing up to 60% alcohol is also amenable to the sorption of flavoring and antiseptic agents, particularly those usually employed in mouthwashes, dentifrices, breath fresheners and other oral hygiene compositions.

It is a feature of the invention that novel alcohol-containing powders are produced by utilizing the heretofore unrealized capabilities of certain modified polysaccharides to sorb large quantities of alcohol when contacted and blended therewith.

Briefly, stated, the objects of the invention are accomplished by bulking, i.e., increasing the bulk volume and effective surface area of low D.E. (dextrose equivalent) dextrins and blending the expanded dextrins with liquid alcohol in ratios such that there is sufficient dextrin present to absorb/adsorp the available alcohol and produce a dry-to-the-touch flowable powder incorporated with up to about 60% alcohol. When hermetically packaged, even though the alcohol-containing powders have, in addition to 60% alcohol by weight, as much as 4.6% water, and are admixed with flavoring and antiseptic agents they remain chemically stable and in flowable physical condition. The products of the invention have good cold water solubility and reconstitute to provide effective oral hygiene preparations.

The essence of the invention resides in the discovery that dextrins having low dextrose equivalent values of from about 5 D.E. to about 15 D.E. and which have been expanded to a low bulk density of from about 0.05g/cc to about 0.30g/cc have the capability for adsorbing/absorbing large amounts of alcohol.

It is not known exactly why the dextrins of the invention are capable of fixing surprisingly large amounts of alcohol but it has been established that these dextrins are amorphous substances having excellent "film-forming" properties and have the inherent capability of being converted to a high bulked physical form wherein their effective surface area to unit weight ratio if exceedingly large.

Further to the invention, there are some special dextrins which are excellent film-forming materials; which can be bulked (as above) to produce low bulk density materials whose bulked physical conditions are not easily altered upon compression; and which are distinguished from the normal dextrins by having the capabilities of dissolving readily in cold water to form clear, sparkling, low viscosity and non-sweet solutions with no off-flavors. Such special dextrins have a D.P. (degree of polymerization) of from 1 to about 20 glucose units with an average D.P. of about 10 (molecular weight about 1600). Furthermore, in comparison with the normal dextrins, the special dextrins which can be produced by enzymatic hydrolysis (e.g., alpha amylase from B. Subtilis) contain about 10% less polymers in the D.P. range above 10 than the normal dextrins having the same D.E. and they have a preponderance of trimer, hexamer and heptamer content equivalent to more than 50% of the oligomers (D.P. 10 and below). Additionally the special dextrins have only a trace to about 1% glucose and a very limited amount of maltose. The low sweetness level of these special dextrins is derived from the limited amount of glucose and maltose present, the low viscosity and good solubility and clarity is due to the reduced level of the higher D.P. materials, and the lack of off-flavors results from the use of enzymes for their preparation in contrast to the conventional acid and/or heat dextrinization. These features of the special dextrins make them particularly suitable for the purposes of the invention since, in addition to being capable of sorbing large quantities of alcohol when expanded by the method of the invention, these alcohol-containing flowable dextrin powders, when admixed with suitable flavoring and antiseptic agents provide oral hygiene powders which have excellent cold water solubility and reconstitute to low viscosity, clear, sparkling liquid preparations.

While it is recognized that most polysaccharide materials have the capability of sorbing relatively small amounts of alcohol, what has apparently escaped the prior art and that which forms the salient point of the present invention, is the discovery that the dextrins described hereinabove are unique in their capabilities to sorb large quantities of alcohol, particularly ethanol, to form powders which are particularly suited for forming alcoholic mouthwash preparations because of their rapid and complete solubility in cold water to form solutions with low viscosities. Specifically, the special dextrins are of a sufficient low average molecular weight to be readily soluble in cold water; they have excellent film-forming properties which permits them to be bulked and are further characterized by their lack of off-flavor and sweetness.

The salient factors of the present invention will become apparent from the description of the preferred embodiments as set forth below.

DESCRIPTION OF THE PREFERRED EMBODIMENTS

Low dextrose equivalent dextrins (5-15 D.E.), as commercially available, have a bulk density of approximately 0.4-0.6g/cc and, although they have some affinity for alcohol in this physical form, a significant increase in their capabilities for adsorping/absorbing alcohol, particularly the low molecular weight primary alcohols such as ethanol and isopropyl alcohol, has been found to result when they are expanded such that their bulk densities are decreased to from about 0.05g/cc to about 0.30g/cc. The procedure for bulking (expanding) the dextrins to the extent of maximizing their effective surface areas to unit weight ratios is an important operation in the practice of the process according to the invention.

The 5-15 D.E. dextrins described above can be expanded to the preferred bulk density range of from 0.05 to 0.30g/cc by spray drying an aqueous solution of the dextrin. An aqueous solution containing 40-65% dextrin solids and preferably about 50% solids is introduced into the spray drier and the solution dried in cocurrent fashion employing an inlet air temperature of from about 425°F. to about 500°F. The drying tower outlet air temperature, while not particularly critical to the method of bulking the dextrins should be maintained within a range of from about 220°F. to about 275°F., preferably by suitable adjustment of the air flow through the spray tower.

Significantly, it has been determined that the bulk density of the expanded dextrin varies inversely with the inlet air temperature and solids concentration of the feed solution and, cognizant of this relationship it is deemed within the ken of those skilled-in-the-art to produce expanded dextrins having a bulk density ranging from 0.05 to 0.30g/cc with but small modifications in the above-described procedure and that set forth in Example VIII below.

In those instances wherein the bulked dextrin is to be the alcohol-containing powder in the ultimate oral hygiene product such as a mouthwash, sweeteners and/or other flavoring agents can be added in small amounts, generally less than 1% to about 5%, to the aqueous dextrin feed solution admitted to the spray drier and the resulting expanded dextrin will have uniformity incorporated therein the desired agent for flavoring the finished product. Thus, in the bulking of the low dextrose equivalent dextrin by spray drying and also by drum drying (described below) such flavoring agents as saccharine, cyclamate and L-aspartyl-1-pheneylalanine methyl ester, for example, can be added in relatively minor amounts to the dextrin solutions fed to either the spray drier or to the drum drier.

Although expanding the dextrins to a bulk density ranging from about 0.05g/cc to about 0.30g/cc by spray-drying is suitable for purposes of the invention, the preferred method for physically expanding the dextrins to a high bulk volume for enhancing their capabilities to sorb ethanol, isopropyl alcohol and other low molecular weight alcohols comprises forming a very thin continuous film of a water solution of the dextrin followed by drum drying the film. The bulking method can best be accomplished by drying the dextrin film from about a 50% aqueous solution of dextrin on an atmospheric drum dryer. The drum dryer roll surfaces are heated from within the drum chambers with steam at about 60 psig and the rolls are rotated at a circumferential speed of about 15-20 ft. per minute. These preferred conditions, of course, can be modified — the important criteria being that the dextrins should be uniformly blended with an amount of water sufficient to effect the formation of a continuous film during the drying step. The thin film of dextrin is dried to a moisture content of from about 2 to about 6% and, when doctored from the rolls forms fine particles of high bulk volume. Drum drying the dextrin material in this manner produces expanded, and not easily compressed, particles of low density, which are amorphous but crystalline-appearing materials, and which are non-hygroscopic and dissolve easily in water. After drying, the products can be comminuted and screened, if desired, to remove particles that are either too large or too fine. The most preferred particle size fraction for practising the invention is that which passes through a 20 mesh screen and is held on a 60 mesh screen (U.S. Standard Sieve) and has a bulk density of from about 0.10 to about 0.15 grams per cubic centimeter.

The conventional, commercially available dextrins having a dextrose equivalent of from about 5 to about 15 are readily expanded by either spray drying or drum drying techniques as described hereinabove. Typical of such commercially available dextrins suitable for expansion by the method of the invention are the 5 D.E.

to 15 D.E. dextrins manufactured by the American Maize Corp., N.Y.,N.Y. and sold under the trademark FRODEX. A dextrin of this type, when expanded to a bulk density ranging from about 0.05g/cc to about 0.30g/cc will sorb an equal weight of alcohol in the course of a gentle blending procedure to produce a flowable alcohol-containing powder which can be used as a base for a powdered mouthwash preparation when, upon reconstitution, a cloudy solution having a relatively high viscosity and some sweetness is not a significant disadvantage.

The special dextrin substances referred to hereinabove are preferred for the purposes of the present invention and are also commercially available. One of the companies manufacturing such dextrins is CPC International, Inc. (formerly Corn Products Company), Englewood Cliffs, New Jersey. These dextrins are marketed under the tradename MOR-REX and are further identified as 5 D.E. MOR-REX and 10 D.E. MOR-REX. Another commerical concern (Grain Processing Corp., Muscatine, Iowa) produces a similar series of dextrins under the tradename MALTRIN.

Dextrin substances equivalent to the commercially available special dextrins can be prepared by special and proper alphaamylase degradation such that maltose and dextrose production are limited. Under these conditions, the D.E. is allowed to reach 5 to 10 or 15 and the dextrins contain little glucose and an irregular distribution of polymeric members with a preponderance (greater than 50%) of trimer, hexamer and heptamer polymers of glucose in the oligosaccharide range.

Briefly, the special dextrins are prepared from corn starch, tapioca starch, potato starch and other starches by the modification of these starches by alpha amylase (B. Subtilis) in accordance with the general procedures described in texts on the subject such as "Chemistry and Industry of Starch", Academic Press Inc., New York, N.Y. 1950 edited by R. W. Kerr. Importantly, the dextrinization of the starch is conducted under carefully controlled conditions of time and temperature to effect a modification of the starch such that the resulting dextrose product, when analysed by standard analytical techniques, including chromotography analysis, has a D.E. of 5 to 15 with little or no glucose and an irregular distribution of polymeric members with a preponderance (greater than 50% of trimer, hexamer and heptamer polymers of glucose in the oligosaccharide range. Although there can be small variations in the temperature range and the time to effect proper conversion, depending primarily on the type and degree of purity of the starch, the procedure normally requires maintaining the starch in aqueous suspension with the enzymes for a period of 20 to 39 minutes during which the temperature of the suspension is uniformly increased from room temperature to 65° – 75°C. A detailed description of the dextrinization of a typical starch to produce a dextrin suitable for purposes of the invention is disclosed in Example I (below). Commercially, available corn syrup dextrins, typified by the products of CPC Internatinal, Englewood Cliffs, N. J. under the tradename MOR-REX, have a similar functionality for purposes of the instant invention as that described above and, upon analysis have been shown to have the irregular distribution of polymeric members with a substantially similar preponderance of trimer, hexamer and heptamer polymers of glucose in the oligosaccharide range with little or no glucose present.

The dextrins, as prepared, have a bulk density of approximately 0.4–0.6g/cc and, although they have some affinity for alcohol in this physical form, a significant increase in their capabilities for adsorbing/absorbing alcohol has been found to result when they are expanded such that their bulk densities are decreased to from about 0.05g/cc to about 0.30g/cc.

The bulked 5, 10, and 15 D.E. special dextrins are products which exhibit rapid and complete solubility in cold water to form clear, colorless solutions. At a concentration of 40% by weight in aqueous solution, the 10 D.E. dextrin has a viscosity of about 70 centipoise at 80°F.

The special dextrins have low moisture absorption relative to the normal dextrins above 15 D.E. The 10 D.E. dextrin at 70% relative humidity and 77°F. absorbs up to about 13% moisture. While each of the bulked dextrins of the invention has excellent affinity for ethyl alcohol, the 5 D.E. dextrin has the capability of sorbing more of the alcohol, expecially when some water is present and, for this reason, is the preferred polysaccharide material for the purposes of the invention.

In contrast to the prior art it is not essential to the success of the invention that anhydrous alcohol be employed for sorption by the dextrin. Surprisingly, it has been found that aqueous alcohol solutions can be sorbed to form alcohol/water-containing stable, flowable powders. While alcohol with a minimum of associated water is preferred, (primarily from the viewpoint of the desirability of having a high concentration of alcohol in the powder), ethyl and/or isopropyl alcohol having as much as 20% dissolved water can be sorbed by the bulked 5 D.E. dextrin (0.16g/cc and 4.1% moisture) to form a stable, flowable powder containing 32% alcohol, 10.5% water and 57.5% dextrin solids. If the bulked 5 D.E. dextrin has a 1 – 2% moisture content more water can be included in the alcohol solution to be sorbed. For example, a 5 D.E. dextrin at this initial low moisture content will sorb 40% by weight of an alcohol solution containing 25% water and produce a product containing 30% alcohol, 13% water and 57% dextrin solids. This is about the maximum amount of water that can be held by this dextrin. Alternatively, the bulked 5 D.E. dextrin, when contacted with 95% by weight alcohol aqueous solution will sorb sufficient solution to form a flowable powder containing 60% alcohol, 35.4% dextrin and 4.6% water.

Each of the above dextrins can be combined with the alcohol to form the products of the invention by sorption of the alcohol by the dextrin in the course of a blending procedure. The addition of appropriate quantities of the alcohol to the dextrin, or vice versa, in a vessel followed by gentle, but thorough mixing, affords adequate inducement for adsorption/absorption to take place resulting in a flowable powder.

Once the alcohol-containing powdered product has been prepared it is stable for extended time periods provided it is hermetically packaged. Such packaging is necessary for stability because the product (as is the case with the prior art products) develops an alcohol vapor pressure greater than atmospheric pressure at room temperature. However, in a vapor-tight package, the product retains its alcoholic content, remains dry-to-the-touch, and retains its original flowable condition characterized by being pourable or spoonable from the container with little or no tendency to clump or otherwise aggregate. As such, produced for alcohol oral hygiene purposes, each of the products can be readily tailored to contain either water soluble or alcohol soluble flavoring ingredients, and antiseptic agents which are usually employed in mouthwash and breath freshener preparations. Alternatively, the alcohol-containing powders can be blended with other materials employed in denture cleaners, tooth powders etc. which may or may not be completely soluble in water or alcohol.

The following examples illustrate the various facets of the invention. It should be understood, however, that these examples are meant to be illustrative and the invention is not to be limited thereto. In the examples which follow, g stands for grams, cc stands for cubic centimeters, D.E. for dextrose equivalents, and the "percentages" provided are percentages by weight.

EXAMPLE I

A 0.8g quantity of alpha amylase (B. Subtilis) - (Takamine HT-1000) was dissolved in 800ml of water. Four hundred grams of potato starch was then mixed into the enzyme solution and the mixture placed in a 75°C. water bath and stirred. In approximately 8 minutes the temperature of the aqueous mixture reached 65°C. and the starch began to thicken (swell). As the temperature increased to 67°C. the enzyme activity became apparent and the slurry became less viscous. After 21 minutes and at a temperature of 71°C. the mixture was clear. The mixture was then quickly heated to the boiling point to deactivate the enzyme, then filtered, and coiling was then continued to concentrate the solution to a heavy syrup. The syrup was then vacuum dried.

The dried dextrin was determined by standard analytical technique to have a dextrose equivalent of 5, a glucose content below 1%, and a chromomatographic analysis showed an irregular distribution of the polymeric members with a preponderance (greater than 50%) of trimer, hexamer and heptamer polymers of glucose in the oligosaccharide range.

EXAMPLE II

Approximately 400g of the 5 D.E. dextrin of Example I was added to 400g of water to form a clear colorless solution. The solution was uniformly applied to the surfaces of heated drum dryer rolls. The solution formed a thin continuous film on the atmospheric drum dryer roll surfaces which were heated from within the roll chambers by steam at 60 psig. The 18 inch-diameter rolls were rotated at 3 rpm and the dried solution of dextrin was then doctored from the rolls in the form of small particles having an average bulk density of 0.16g/cc and a moisture content of 5.5%.

EXAMPLE III

A 150g amount of the bulked 5 D.E. dextrin of Example II was blended with 250g of 90% (10% by weight water) ethanol in a Hobart mixer at speed No. 2 with a wire whisk for 2 minutes. A dry-to-the-touch free flowing powder was obtained that contained 56.2% ethanol and 8.3% moisture. The bulked ethanol containing flowable powder was packaged in air-tight foil envelopes and after 6 months storage had retained its flowability characteristics and its original alcohol content.

EXAMPLE IV

The procedure described in Example II was repeated with a 15 D.E. conventional dextrin (FRODEX 15 D.E.), to bulk the dextrin to an average density of 0.19g/cc and moisture content of 2.1%.

EXAMPLE V

A 200g amount of the bulked dextrin of Example IV was blended with 200g of absolute ethyl alcohol in a Hobart mixer at a speed of No. 2 with a wire whisk for 2 minutes. A dry-to-the-touch free flowing powder was obtained that contained 50% alcohol, 48.9% dextrin and 1.1% moisture. The bulked ethanol-containing flowable powder was packed as in Example III and retained its flowable characteristics and its original alcohol content when stored for a period exceeding 6 months.

EXAMPLE VI

To a 500g quantity of 5 D.E. MOR-REX dextrin (0.36g/cc; 5.4% $H_2O$) was added 500g of water to form a clear colorless solution. The solution was uniformly applied to the surfaces of heated drum dryer rolls. The solution formed a thin continuous film on the atmospheric drum dryer roll surfaces which were heated from within the roll chambers by steam at 60 psig. The 18 inch-diameter rolls were rotated at 3 rpm and the dried solution of dextrin was then doctored from the rolls in the form of small particles having an average bulk density of 0.16g/cc and a moisture content of 5.5%.

EXAMPLE VII

A 150g amount of the bulked 5 D.E. MOR-REX dextrin of Example VI was blended with 250g of 90% (10% by weight water) ethanol in a Hobart mixer at speed No. 2 with a wire whisk for 2 minutes. A dry-to-the-touch free flowing powder was obtained that contained 56.2% ethanol and 8.3% moisture. The bulked ethanol containing flowable powder was packaged in air-tight foil envelopes and after 6 months storage had retained its flowability characteristics and its original alcohol content.

EXAMPLE VIII

A 50% solids solution of 10 D.E. MOR-REX dextrin was spray dried to expand the dried dextrin to a bulk density of 0.14g/cc. The spray drier was equipped with a single 1/1TC "Whirljet" nozzle and was operated with a nozzle pressure of 500 to 700 psig; an inlet air temperature of 400°F; an air flow rate of 2800 cu.ft./min., an air outlet temperature of 245°F., and a solution feed temperature of 155°F. The expanded spray dried powder was screened through a 30 mesh U.S. mesh screen.

EXAMPLE IX

The procedure of Example VIII was repeated with substantially the same results except a small quantity of L-aspartyl-L-phenylalamine (1.75% of the weight of the solution) was added to the dextrin feed solution to the spray drier. The resulting expanded dextrin, also having a bulk density of 0.14g/cc had a pleasant sweet taste.

EXAMPLE X

To 275g of the bulked 10 D.E. dextrin of Example VIII was added 375g of 95% ethanol (5% water by weight) and blended as in Example V. The resultant product was flowable and analyzed to contain 52.5% of ethanol and 3.1% moisture.

EXAMPLE XI

A mouthwash powder was prepared by blending the alcohol-containing powder of Example III with flavoring and coloring agents. Single use amounts of the preparation, each having the following formulation:

| | |
|---|---|
| Dextrin + alcohol powder | 2.60 grams |
| Peppermint Flavor | 1.25 grams |
| F.D.&C. Red No. 2 Color | .002 grams |
| Sodium Saccharin | .045 grams |
| Citric Acid | .03 grams |
| Total | 3.927 grams | were packaged in individual foil packets. The powdered mouthwash was flowable after storage in the hermetically sealed envelopes and, when added to 30 ml of cold water readily dissolved with but a small amount of agitation to produce an excellent mouthwash solution containing about 4.5% ethanol.

EXAMPLE XII

The expanded dextrin of Example VI was employed to sorb a denatured ethanol. A 400g quantity of 95% ethanol containing small amounts of boric acid, menthol and eucalyptol as denaturing agents was blended with 280g of the bulked 5 D.E. dextrin of Example VI. The alcohol-containing product was analyzed to contain 59% ethanol and 1% mouthwash flavor. The alcohol-containing powder was then blended with additional flavoring, coloring and texture agents and single use amounts were packaged in small foil envelopes. Each single use envelope contained:

| | |
|---|---|
| Powder-denatured alcohol | 7.5 grams |
| Cetyl Pyridinium Chloride | .0029 grams |
| Sodium Saccharin | .0070 grams |
| Sodium Phosphate, dibasic | .0594 grams |
| Methocel 65 HG, 4000 CPS | .0178 grams |
| Color (D&C Green No. 5/D&C Yellow No. 10) | .0003 grams |
| Total | 7.5874 grams |

The mouthwash preparation was stable during storage and when a packet was opened the contents readily poured into a drinking glass containing about 30cc of water. The powder readily dissolved in the water with mild agitation to form a effective mouthwash containing 14.75% ethanol.

As illustrated by the above examples, the alcohol-containing dextrin powders are effective base material in the formulation of unique alcohol-containing oral hygiene powders.

In addition to powdered mouthwashes, the alcohol-containing powders can be blended with those materials employed to formulate dental powders wherein the base alcohol-containing material acts as a astringent. Similarly, the powder can be employed as a base in denture cleaners and in other mouth freshener preparations.

Essentially, the alcohol-containing powder can be blended with all of the typical agents used in oral hygiene products including anti-bacterial agents, anticaries agents, coloring agents, flavoring agents, etc. to produce dry-to-the-touch flowable powdered oral hygiene products which have an alcoholic content in the desired range of from about 3% to about 15% or higher and are stable when hermetically packaged.

As will be readily recognized by those skilled-in-the-art, many modifications of the products described above are possible and yet within the spirit of the invention. For example, it has been determined that isopropyl alcohol can be sorped by the expanded dextrins of the invention to about the same extent as ethanol and, therefore, the isopropyl alcohol-containing dextrin powder finds application as a base material for skin care products.

By the foregoing, the present invention has been described in such detail as to enable others skilled-in-the-art to make and use the same, and, by applying current knowledge, adopt the same for use under varying conditions of service, without departing from the essential features of novelty thereof, which are intended to be defined and secured by the appended claims.

What is claimed is:

1. A method of preparing a flowable, dry-to-the-touch, alcohol-containing mouthwash powder which comprises:
   a. dissolving in water a dextrin having a dextrose equivalent of from about 5 to about 15;
   b. expanding the dextrin by forming a film of the solution of (a) and drying said film;
   c. subdividing the dried film of dextrin to yield particulates of expanded dextrin having a size corresponding to a 20—60 mesh screen opening (U.S.S. Sieve), a moisture content ranging from about 2 to about 6% and a bulk density ranging from about 0.05 to about 0.30 grams/cubic centimeter;
   d. contacting the expanded dextrin of (c) with an aqueous solution of ethanol so as to cause the dextrin to sorb from about 30 to about 60% ethanol by weight of the resulting flowable ethanol-containing powder; and
   e. blending the alcohol-containing dextrin of (d) with small but effective amounts of mouthwash flavoring and coloring materials whereby a flowable powdered mouthwash mixture is prepared containing from about 30 to about 60% ethanol, said mouthwash being readily soluble in cold water to produce a mouthwash solution for oral hygiene purposes.

2. The method of claim 1 wherein the 5–15 D.E. dextrin is expanded by forming a film of the solution and drum drying the film.

3. The method of claim 1 wherein the 5–15 D.E. dextrin is expanded by forming a film of the solution and drying the film in a spray drier.

4. The method of claim 1 wherein the expanded dextrin is contacted with an aqueous solution of ethanol which has been denatured with mouthwash alcohol denaturing materials.

5. The method of claim 1 wherein aqueous solution of the 5–15 D.E. dextrin is further characterized by combining, in addition to the dextrin, small but effective amounts in the range of 1–4% solids content by weight of the solution of sweetening agents selected from the group consisting of L-aspartyl-L-pheylalanine methyl ester, saccharine, cyclamate, and mixtures thereof.

6. The method of claim 1 wherein the dextrin having a dextrose equivalent of from about 5 to about 15 is further characterized by having more than 50% of the trimer, hexamer and heptamer ligomers by weight of its total oligomer (10 or less degree of polymerization) content and less than about 1% glucose.

7. The method of claim 1 further including the addition of small but effective amounts of mouthwash antibacterial agents to the mouthwash powdered mixture.

8. A dry-to-the-touch, alcohol-containing flowable mouthwash powder comprising:

a. small but effective amounts of mouthwash flavoring and coloring materials, intimately blended with
b. particulates of dry expanded dextrin, said particulates of dextrin having a dextrose equivalent of from about 5 to about 15, a moisture content ranging from about 2 to about 6%, a bulk density ranging from about 0.05 to about 0.30 grams/cubic centimeter, and from about 30 to about 60% by weight of added ethanol absorbed within said particulates.

9. The product of claim 8 further characterized in that the dextrin has more than 50% of the trimer, hexamer and heptamer oligomers by weight of its total oligomer (10 or less degree of polymerization) content and less than about 1% glucose.

10. A mouthwash comprising an aqueous solution of the product of claim 8.

11. A mouthwash comprising an aqueous solution of the product of claim 9.

* * * * *